Sept. 24, 1963  W. E. DOWLING ET AL  3,104,916
PISTON ROD SEAL FOR SHOCK ABSORBERS
Filed Sept. 8, 1960
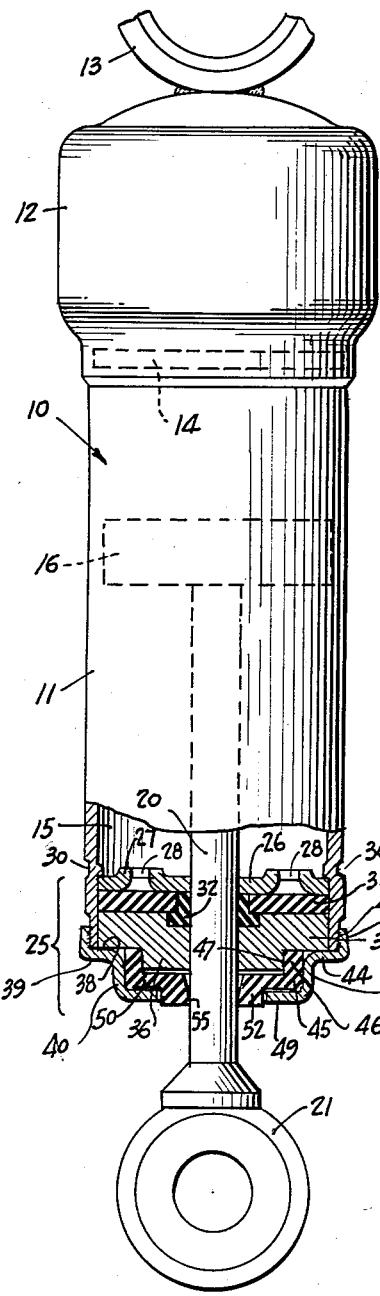
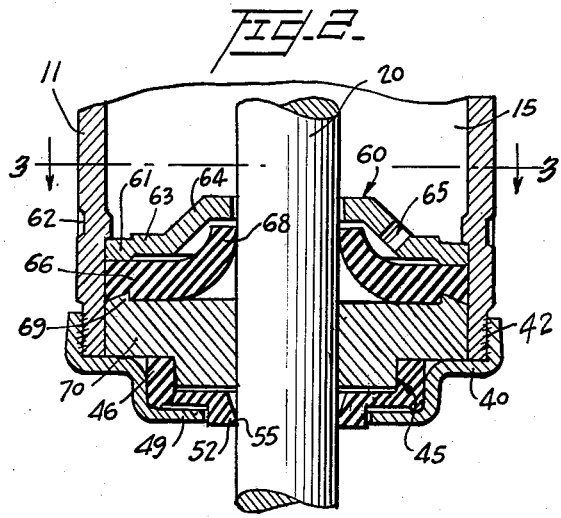
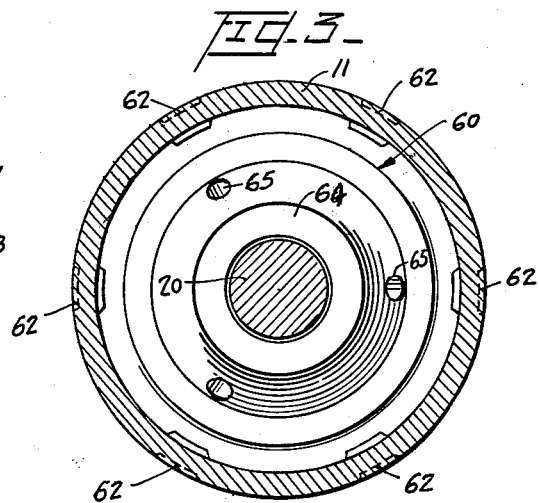
INVENTORS
William E. Dowling and
John E. Hickethom
BY Watson, Cole, Grindle & Watson
ATTORNEYS United States Patent Office 3,104,916
Patented Sept. 24, 1963

3,104,916
PISTON ROD SEAL FOR SHOCK ABSORBERS
William E. Dowling and John E. Heckethorn, Dyersburg, Tenn., assignors, by mesne assignments, to Christian Marie Lucien Louis Bourcier de Carbon, Neuilly-sur-Seine, France
Filed Sept. 8, 1960, Ser. No. 54,759
5 Claims. (Cl. 308—3.5)

This invention relates to shock absorbers of the direct-acting cylinder-and-piston type and more particularly to sealing means for the end of the cylinder through which the piston rod passes.

The general object of the invention is the provision of a novel and improved cylinder end wall structure providing an effective sealing structure for the piston rod as well as guiding and centering means.

A further object of the invention is to provide, in conjunction with the rod guiding feature, a novel dust seal which serves to keep dust, mud, water, calcium chloride, and other foreign matter encountered on the road from entering the rod guide compartment, and also to retain the rod guide lubricant. This is, of course, an important feature when the shock absorber is employed in automobile installations.

The invention, in its preferred embodiments, contemplates the provision of a rod guide and seal assembly which is particularly effective in use in automotive shock absorbers of the type in which the cylinder is uppermost, being secured to the body of the car, and in which the piston rod depends from the shock absorber cylinder and is connected at its lower end with the wheel mounting. Obviously, this arrangement presents more of a problem in preventing leakage of damping fluid or lubricant than the older type of shock absorber wherein the piston rod extends upwardly from the upper end of the cylinder. However, by virtue of the novel features of the present invention, which will be developed in detail as the specification proceeds, the guiding and centering of the rod and the sealing of the cylinder against leakage of fluid and the entry of foreign particles are effectively attained.

The guiding and sealing means afforded by the present invention are equally applicable to shock absorbers employing a damping fluid reservoir separated from the working chamber by a valved partition and to combined hydraulic and pneumatic shock absorbers in which a gas under pressure of several atmospheres is introduced into the cylinder above the working liquid, means being provided for utilizing the internal pressure of the working liquid to enhance the effectiveness of the seal.

Other objects and features of novelty, including a novel welded outer retainer elements which also serves the purpose of accurately gauging the positioning of the piston rod guide means, will be apparent from the following specification when read in connection with the accompanying drawings, in which certain embodiments of the invention are illustrated by way of example.

In the drawings:

FIGURE 1 is a view in elevation of a telescoping shock absorber embodying the principles of the invention, the sealing structure being shown in vertical section;

FIGURE 2 is an enlarged detail view of the sealing structure of a modified construction; and FIGURE 3 is a view in horizontal section taken on line 3—3 of FIGURE 2.

In FIGURE 1 the shock absorber as a whole is given the general reference character 10 and comprises the working cylinder 11 and an enlarged damping liquid reservoir 12. The upper end of the cylinder portion of the shock absorber is provided with an eye suggested at 13 by means of which it may be connected to the body of a motor vehicle or other member the motion of which is to be damped. A valved partition suggested diagrammatically at 14 is interposed between the working chamber 15 within the cylinder 11 and the expansion chamber within the part 12. A piston diagrammatically represented at 16 is adapted to reciprocate within the working chamber 15 and the piston rod 20 passes out of the lower end of the cylinder 11 and is provided with an eye 21 by means of which it may be connected, for example, to the wheel mounting of a vehicle. The novel combined sealing and guiding structure characterizing this embodiment of the invention is given the general reference character 25, this structure embodying in effect the bottom end wall of the cylinder 11 and an effective sealing and packing arrangement for the piston rod 20 as it moves into and out of the cylinder during operation of the device.

An inner retainer element 26 comprises a disc having a series of bosses 27 around it, these embossed portions of the disc being provided with openings 28. The disc 26 is preferably made of metal and has a smooth peripheral fit within the lower end of the cylinder 11 and its upward movement within the cylinder is limited by the provision of the staking shown at 30, this procedure eliminating all machining of the inside of the cylinder.

Next below the retainer 26 is the actual principal seal member which comprises a centrally located stepped plug 32 which may be made of a low friction synthetic plastic elastomer.

A seal actuator disc 34 surrounds the narrower portion of the sealing plug 32. Since this disc 34 in its relaxed state is normally of greater diameter than the inside diameter of the cylinder, a radially inward pressure is exerted around the plug 32. This tendency to exert such inward pressure is augmented by the pressure of the working fluid admitted through the openings 28 in the inner retainer disc 26. The lower larger periphery of the seal plug 32 is received within a central recess in the rod guide bearing 35.

The rod guide bearing member 35 is made of sintered and porous iron-graphite composition impregnated with a lubricant for the life of the element, and the member is provided with a depending central portion or boss 36. The lower annular peripheral face portion of the guide bearing 35 indicated at 38, is flush with the lower rim 39 of the cylinder 11 when parts are pressed into their installed positions.

In order to bind the several components securely together and accurately gauge the position of the guide bearing 35 as well as to support the dust seal, which will presently be described, an outer retainer element 40 is provided. This element has an external upwardly directed flange 41 which surrounds the lower rim of the cylinder 11 and is welded thereto by resistance welding as indicated at 42. The inwardly directed annular shoulder portion 44 of the retainer 40 underlies both the lower rim 39 of the cylinder and the peripheral bottom face 38 of the guide bearing 35 and squares the guide bushing up with the end of the cylinder or tube 11.

Surrounding the lower central portion 36 of the guide bearing is the upwardly directed annular flange 46 of the dust seal member 45. This dust seal or rod wiper is molded from a low-friction buna compound and the flange 46 is securely gripped between the peripheral edge 47 of the portion 36 and the annular portion 48 of the outer retainer member 40.

The lowermost portion of the retainer 40 is constituted by the inwardly directed bottom wall 49 which underlies the intermediate portion 50 of the dust seal 45 but is spaced very slightly below this portion.

It will be observed from FIGURE 1 that the central annular wiping flange 52 of the element 45 extends through a space between the lower plate portion 49 of the retainer and the wall of the piston rod. However, only the lower inward portion of this sealing flange 52 contacts the rod as shown at 55, the entire lower angular portion of the wiper 45, except at this point 55, being spaced away from its surrounding rigid elements. Thus, there is a slight space between the dust seal member 45 and the lower face of the downward projecting boss portion 36 of the rod guide; there is a slight space between the bottom plate 49 of the retainer 40 and the lower surface of the intermediate portion of the seal 45; and there is also a slight clearance space between the inner rim of the bottom plate portion 45 of the retainer and the effective wiping flange 52 of the dust seal element 45. Furthermore, there is a slight angular clearance between the root of the wiping flange 52 and the piston rod at certain areas above the contact point 55.

Thus the wiper or dust seal element 45 is securely gripped between the rod guide 35 and the outer retainer 40 at its inner flange 46, but has a free floating support at its lower rod-contacting portion affording slight endwise movement of this portion during operation, which causes the seal to relax as the rod is withdrawn and causes it to wipe firmly as the rod is entering the cylinder.

The positioning of the various parts is such that a faulty resistance-weld at 42 will not cause leakage of the fluid contained in the working chamber.

In the embodiment shown in FIGURES 2 and 3 of the drawings a modification of the novel cylinder end seal structure is illustrated. Here the inner retainer plate 60 has a lower outer flange portion 61, which bears upwardly against the annular series of stakes 62 formed in the wall of the cylinder 11; an upwardly displaced intermediate portion 63; and an inward slightly conical portion 64.

The upper portion 60 surrounds the piston rod 20 with a slight clearance and around its inclined edges it is provided with a series of openings 65 permitting fluid access from the working chamber 15 to the sealing structure.

The principal seal element is shown at 66 and comprises a molded synthetic elastomer of a relatively low coefficient of friction in the from of a disc having a frusto-conical central portion. The inner portion of the disc comprises a flange 68 defining an opening which in repose is of a smaller diameter than that of the rod 20 and thus this portion of the seal presses firmly against the rod effectively sealing the junction. The sealing effect is augmented by the passage of working fluid under pressure through the openings 65 and bearing upon the upper surface of the seal 66.

The outer peripheral portion of the seal 66 is gripped between the lower peripheral edge portion 61 of the inner retainer member 60 and the ribbed annular portion 69 of the rod guide bearing 70. The rod guide bearing is made of sintered metal impregnated with lubricant as described in connection with the element 35 of FIGURE 1 of the drawings.

The dust seal and retainer structure at the lower part of the seal assembly of FIGURE 2 is exactly the same as that described in connection with FIGURE 1 and corresponding numerals are employed to indicate the various parts.

It is understood that various changes and modifications may be made in the embodiments illustrated and described therein without departing from the scope of the invention as defined by the subjoined claims.

Having thus described the invention, what is claimed as new and desired to be secured by Letters Patent is:

1. Supplemental sealing structure for the piston rod of a hydraulic telescoping cylinder-and-piston shock absorber in which the end of the cylinder through which the piston rod reciprocates is provided with sealing and guiding means including a rigid rod guide plate fitted within the end of the casing wall and having an opening through which said piston rod is guided; said guide plate having the outer marginal portion of its outward facing surface substantially flush with the end of the cylinder wall, said guide plate having a centrally disposed outwardly projecting boss formed thereon; said supplemental structure comprising: an outer retainer element having a peripheral flange embracing the end portion of the casing wall and resistance welded thereto, a transverse intermediate portion of the outer retainer element bearing against both the end of the casing wall and the said marginal portion of the outer face of the rod guide to square up the guide plate with the end of said wall, the axially outwardly projecting intermediate boss of the guide plate and outer retainer element being spaced apart, and a dust seal member having a peripheral portion seized between said outwardly projecting intermediate boss of the guide plate and retainer element, and having an inner annular portion closely and slidingly engaging the piston rod but free of gripping support whereby it is subject to limited floating flexing movement.

2. Supplemental sealing structure for the piston rod of a hydraulic telescoping cylinder-and-piston shock absorber in which the end of the cylinder through which the piston rod reciprocates is provided with sealing and guiding means including a rigid rod guide plate fixedly secured within the end of the casing wall and having an opening through which said piston rod is guided; said supplemental structure comprising: an annular retainer element disposed axially outwardly of said guide plate, and secured peripherally to the end of said casing wall; and a flexible dust seal member having a radially outer peripheral portion only gripped between said guide plate and said retainer element, and having a radially inner portion with an axial opening through which said piston rod extends with rubbing contact, said last named portion being normally freely floating and out of contact both radially and axially with any other portion of the rod sealing structure.

3. Supplemental sealing structure for the piston rod of a hydraulic telescoping cylinder-and-piston shock absorber in which the end of the cylinder through which the piston rod reciprocates is provided with sealing and guiding means including a rigid rod guide plate fitted within the end of the casing wall and having an opening through which said piston rod is guided; said guide plate having a centrally disposed outwardly projecting boss formed thereon; said supplemental structure comprising: an annular retaining element disposed axially outwardly of said guide plate, fitted to the end of said casing wall, and secured peripherally thereto; an intermediate transverse portion of the retaining element overlying a portion of the outer peripheral portion of the rod guide plate, and an axially outwardly extending cylindrical portion concentric with and spaced from the boss on the guide plate; a dust seal member of flexible material having an outer axially extending annular flange gripped between the spaced annular concentric portions of the boss and the retaining element, an intermediate transversely extending portion of the dust seal member free of gripping seizure by said concentric portions, and an inner axially extending flange closely and slidingly embracing said piston rod but otherwise free for a limited floating flexing movement.

4. Supplemental sealing structure for the piston rod of a hydraulic telescoping cylinder-and-piston shock absorber in which the end of the cylinder through which the piston rod reciprocates is provided with sealing and guiding means including a rigid rod guide plate fitted within the end of the casing wall and having an opening through which said piston rod is guided; said guide plate having a centrally disposed outwardly projecting boss formed thereon; said supplemental structure comprising: an annular retaining element disposed axially outwardly of said guide plate, fitted to the end of said casing wall, and having a peripheral flange secured thereto by resistance-welding; an intermediate transverse portion of the retaining element overlying a portion of the outer peripheral portion of the rod guide plate, and an axially outwardly extending cylindrical portion concentric with and spaced from the boss on the guide plate; a dust seal member of elastomeric low-friction material having an outer axially extending annular flange gripped between the spaced annular concentric portions of the boss and the retaining element, an intermediate transversely extending portion of the dust seal member free of gripping seizure by said concentric portions, and an inner axially extending flange closely and slidingly embracing said piston rod at least adjacent the axially outward extremity of the flange, but otherwise free for a limited floating flexing movement.

5. The supplemental sealing structure as set forth in claim 4 in which the inner wall of said axially extending flange is chamfered to form a frusto-conical surface the narrow portion of which is axially outwardly disposed to provide restricted flexible contact with the piston rod wall.

References Cited in the file of this patent
UNITED STATES PATENTS

| | | |
|---|---|---|
| 2,644,701 | Flick | July 7, 1953 |
| 2,707,135 | Monahan | Apr. 26, 1955 |
| 2,874,983 | Densmore | Feb. 24, 1959 |
| 3,020,055 | Allinquant | Feb. 6, 1962 |